(12) United States Patent
Hall et al.

(10) Patent No.: US 10,356,831 B2
(45) Date of Patent: Jul. 16, 2019

(54) PREEMPTIVE MAINTENANCE FOR A CLIENT-SERVER MASQUERADING NETWORK

(71) Applicants: David R. Hall, Provo, UT (US); Mark Hall, Springville, UT (US); Craig Boswell, Draper, UT (US)

(72) Inventors: David R. Hall, Provo, UT (US); Mark Hall, Springville, UT (US); Craig Boswell, Draper, UT (US)

(73) Assignee: Hall Labs LLC, Provo, UT (US)

( * ) Notice: Subject to any disclaimer, the term of this patent is extended or adjusted under 35 U.S.C. 154(b) by 62 days.

(21) Appl. No.: 15/411,449

(22) Filed: Jan. 20, 2017

(65) Prior Publication Data
US 2018/0213573 A1    Jul. 26, 2018

(51) Int. Cl.
*H04W 76/11* (2018.01)
*H04W 8/00* (2009.01)
*H04L 12/26* (2006.01)
*H04W 52/00* (2009.01)

(52) U.S. Cl.
CPC .......... *H04W 76/11* (2018.02); *H04L 43/065* (2013.01); *H04L 43/0817* (2013.01); *H04W 8/005* (2013.01); *H04W 52/00* (2013.01)

(58) Field of Classification Search
CPC ... H04W 26/11; H04W 8/005; H04W 76/021; H04L 43/06
USPC ....................................................... 370/389
See application file for complete search history.

(56) References Cited

U.S. PATENT DOCUMENTS

| | | | |
|---|---|---|---|
| 2003/0032421 A1* | 2/2003 | Izumi ................ | H04M 3/08 455/420 |
| 2009/0232047 A1* | 9/2009 | Lynch, Jr. ............ | H04W 84/22 370/328 |
| 2012/0201205 A1* | 8/2012 | Gopalakrishnan .... | H04L 1/1816 370/329 |
| 2013/0010609 A1* | 1/2013 | Lund ................... | H04L 45/00 370/242 |
| 2015/0208349 A1* | 7/2015 | Ramamurthy .... | H04W 52/0212 370/311 |
| 2015/0282069 A1* | 10/2015 | Hobbs ............... | H04W 52/0206 370/252 |
| 2015/0334576 A1* | 11/2015 | Sofman .............. | H04W 16/18 455/456.1 |
| 2015/0334615 A1* | 11/2015 | Zhang ................. | H04W 36/04 370/331 |

* cited by examiner

*Primary Examiner* — Sai Ming Chan

(57) ABSTRACT

A method for controlling communication between a remote device and a control server includes sending, over a long range radio communication link, to a number of remote devices, a number of reduced packets, each of the number of reduced packets causing each of the number of remote devices to generate a reduced response packet, the reduced response packet indicating a status of each of the number of remote devices, receiving, from a number of responding remote devices, a number of actual reduced response packets to identify when a remote device is in a report state, examining status data related to each of the number of remote devices, the status data comprising a number of attributes include a remote device reduced packet, a remote device reduced response packet, and a number of remote device attributes, when a fault is detected, generating a remote devices fault report, and transmitting, to a control server, a remote device fault report.

18 Claims, 10 Drawing Sheets

PREEMPTIVE MAINTENANCE FOR A CLIENT-SERVER MASQUERADING NETWORK

TECHNICAL FIELD

The disclosure relates generally to the field of communicating via a network with a device. Specifically, the disclosure relates to wireless communication between devices that have limited connectivity and control servers.

BACKGROUND

Wireless IoT communication is the cutting edge of modern consumer and commercial electronics. However, some significant roadblocks stand in the way of IoT ubiquity. In particular, the limited range of current protocols, such as Wi-Fi, Bluetooth, Z-Wave, and Zigbee, limit the applications of those networks, particularly in RF-noisy environments and applications that require long-range communication (which is further limited by government regulation). Additionally, different devices require different amounts of data to control those devices, and typical systems sacrifice range for speed. Thus, low-data devices are range limited by unnecessary data speed. This is especially the case for high-speed protocols such as Wi-Fi, Bluetooth and Zigbee. Another issue facing IoT networks is FCC regulation. The FCC limits power output, and most protocols transmit at maximum power levels, significantly beyond what is necessary to have a stable link, wasting power and unnecessarily reducing battery life. Yet another issue facing IoT networks is that processing an entire data packet to determine whether that information is intended for those devices results in unnecessary power drain and slower transmission speeds of data across the IoT networks. Additionally, FCC regulations may provide government-imposed limits, such as the limit that the maximum transmitter output power, fed into the antenna, not exceed 30 dBm (1 watt) for unlicensed wireless equipment operating in the ISM band.

Some protocols, such as Z-wave, may address these issues by communicating on the low data 900 MHz ISM band, but are still significantly range-limited. For example, even when fully meshed, the range of a Z-wave network is only 160 meters, which is limiting in many settings. Additionally, Z-wave and other similar protocols operate on a single frequency, and rely on time-division and other similar multiplexing to communicate with multiple devices. This makes these protocols especially susceptible to collisions and interference with other networks and devices, and requires additional data to secure communications, all of which increases the amount of data that needs to be transmitted and decreases range. The requirement for multiple hubs and/or devices to mesh and extend the network also increases costs associated with the network, with only marginal improvements in range.

Other wireless networks, such as cellular networks, rely on large and expensive antenna arrays, with high power output and expensive high-gain receivers. Because of expense and regulatory limitations, such networks are not feasible for most, if not all, commercial IoT applications, and are certainly out of the question for private residential settings. Thus, despite efforts in the industry, significant problems still remain.

Other types of protocols which use wireless communication include Bluetooth and Wi-Fi. Each protocol has its own range limitations. Additionally, many protocols such as Bluetooth or Wi-Fi require a two-way connection between a client and an access point. At times when the connection between a smart device, such as a Blue-tooth enabled furnace, and a host is lost, then the host will drop the smart device.

Various protocols are used for organizing information that is sent over a network; standard protocols allow for various devices to communicate with each other. For example, the IPX packet begins with a header which has the following fields and the number of bytes allocated for that field follows in parentheses: Checksum (2 bytes), Packet Length-including the IPX header (2 bytes), Transport Control, also known as hop count (1 byte), Packet Type (1 byte), Destination address (12 bytes), and Source address (12 bytes). The IPX packet protocol had limited data routing abilities and became disfavored with the rise of the Internet. IPX has been generally replaced by the TCP/IP protocol, which is used for exchanging data between a single network device and another network device. The User Datagram Protocol is a transport layer protocol on TCP/IP that is designed for broadcasting messages to multiple network devices.

TCP/IP consists mainly of TCP (Transmission Control Protocol) and IP (Internet Protocol). The IP protocol is used for addressing and routing packets between hosts. An IP packet consists of an IP header and an IP payload.

A datagram is a basic transfer associated with a packet-switched network. Typically, a datagram is structured to include a payload and a header. Datagrams provide two-way communication services across a packet switched network. The delivery, arrival time, and order of arrival of datagrams need not be guaranteed by the network.

A typical IP packet consists of the following IP headers: Source IP Address (the IP address of the original source of the IP datagram); Destination IP Address (the IP address of the final destination of the IP datagram); Identification (used to identify a specific IP datagram and to identify all fragments of a specific IP datagram if fragmentation occurs); Protocol (informs IP at the destination host whether to pass the packet up to TCP, UDP, ICMP, or other protocols), Checksum (a simple mathematical computation used to verify the integrity of the IP header); and Time-to-Live (designates the number of networks on which the datagram is allowed to travel before being discarded by a router; the TTL is set by the sending host and is used to prevent packets from endlessly circulating on an IP internetwork; when forwarding an IP packet, routers are required to decrease the TTL by at least one). See https://technet.microsoft.com/en-us/library/cc958827.aspx.

The use of the TCP/IP protocol may result in cost issues, since following the TCP/IP protocol can use up bandwidth and create bandwidth issues. The packet information that is part of the TCP/IP protocol may significantly increase total transmitted data in comparison to the user's intent on communicating.

A protocol may examine a packet and handle information within the packet. In one example, a network packet is embedded in another packet, such as "IP masquerading." When a packet is sent, an encapsulated packet is prepared and sent as the payload data. When the packet is received, the payload data is removed and examined, and the encapsulated packet is then sent over a network.

Control data is an inherent part of the transport method. Control data is transmitted in addition to the actual data transmitted by user. The control data is removed when the data arrives. A protocol, such as the IP protocol, includes data to control the routing of the payload data.

In one example, the IP version 4 control data sends fourteen fields. These fields include a version, an internet header length, a differentiated service code point, and explicit Congestion Notification, a total packet length, an identification field, a number of flags, a fragment offset, a time to live, a protocol, a header checksum, a source address, a destination address, and a number of options.

Delivering a wireless communication over a distance is a known problem in the art. For example, the Bluetooth® wireless communication protocol is relatively short range, and some may use mesh nodes as repeaters in an attempt to extend the range of the Bluetooth® wireless communication protocol. Communications may be transmitted over as many as 20 mesh hops or more. Mesh nodes may allow the extension of a transmission area, however, the use of mesh nodes typically adds a cost overhead to retransmitting packets. Users generally set up the nodes to be in relatively close physical proximity to each other. When the transmission distance of the protocol is exceeded, mesh nodes may sever the proximity network and prevent communication. When expanding the distance of wireless transmission, such as to a barn that is remotely located from a residence, a preferred method in the art is to install a physical wire connection.

Additionally, after the attack on Sep. 11, 2001, builders are now more likely to use concrete cores; for example, modern skyscrapers may use thick concrete cores which obstruct wireless signals; in some instances, the builders may drill holes of 50 feet or longer and pass an Ethernet cable or other hardwire through thick building materials which obstruct wireless signals.

BRIEF SUMMARY

A method for controlling communication between a remote device and a control server. The method includes sending, over a long range radio communication link, to a number of remote devices, a number of reduced packets. Each of the number of reduced packets causes each of the number of remote devices to generate a reduced response packet. The reduced response packet indicates a status of each of the number of remote devices. The method includes receiving, from a number of responding remote devices, a number of actual reduced response packets to identify when a remote device is in a report state. The method includes examining status data related to each of the number of remote devices. The status data includes a number of attributes include a remote device reduced packet, a remote device reduced response packet, and a number of remote device attributes. A remote device fault report is generated when a fault is detected. The remote device fault report is transmitted to a control server.

An apparatus for controlling remote devices includes a processor, a network interface, communicatively connected to the processor, a long range radio communication interface, and a non-transitory storage medium. The non-transitory storage medium storing medium includes a number of modules. Each module contains computer program code to, when executed by the processor, cause the processor to perform a specific task. A send module sends, over the long range radio communication interface, to a number of remote devices, a number of reduced packets. Each of the reduced packets causes each of the number of remote devices to generate a reduced response packet. The reduced response packet indicates a status of each of the number of remote devices. A receive module receives, from a number of responding remote devices a number of actual reduced response packets to identify when a remote device is in a report state. An examine module examines status data related to each of the number of remote devices. The status data includes a number of attributes such as a remote device reduced packet, a remote device reduced response packet, and a number of remote device attributes. A generate module generates, when a fault is detected, a remote devices fault report. A transmit module transmits to a control server using the network interface, a remote device fault report.

BRIEF DESCRIPTION OF THE DRAWINGS

A more particular description of the invention briefly described above is made below by reference to specific example. Several examples are depicted in drawings included with this application. An example is presented to illustrate, but not restrict, the invention.

DETAILED DESCRIPTION

Figure 1:
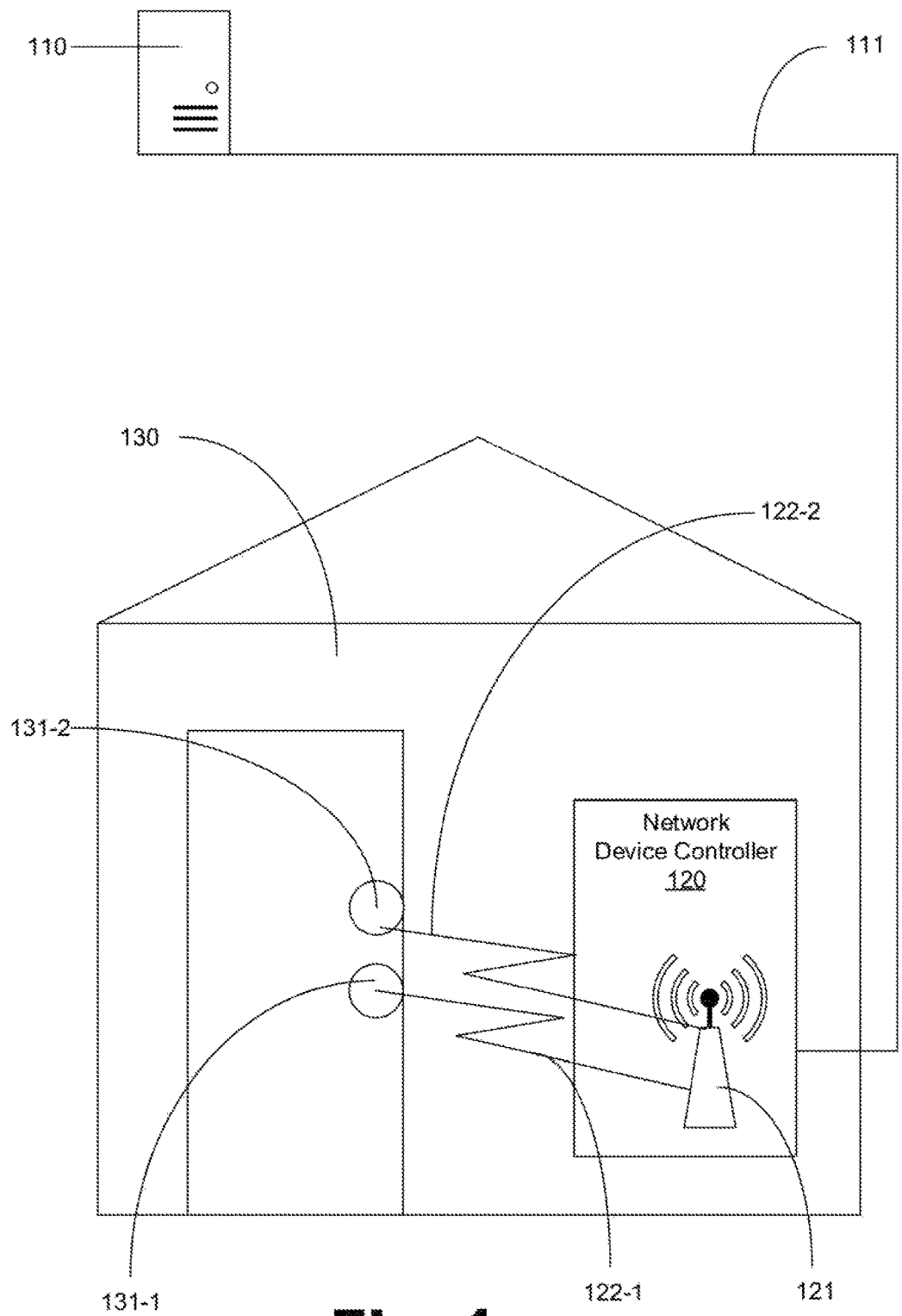
FIG. 1 illustrates an apparatus that communicates with a control server and household devices.

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed.

In some instances, numerical values are used to describe features such as spreading factors, output power, bandwidths, link budgets, data rates, and distances. Though precise numbers are used, one of skill in the art recognizes that small variations in the precisely stated values do not substantially alter the function of the feature being described. In some cases, a variation of up to 50% of the stated value does not alter the function of the feature. Thus, unless otherwise stated, precisely stated values should be read as the stated number, plus or minus a standard variation common and acceptable in the art.

For purposes of this disclosure, the modules refer to a combination of hardware and program instructions to perform a designated function. Each of the modules may include a processor and memory. The program instructions are stored in the memory, and cause the processor to execute the designated function of the modules. Additionally, a smartphone app and a corresponding computer system for the smartphone app may be used to control the access control.

A purpose of the claimed methods and computer program product is to facilitate the transfer of information between a wireless networking protocol and a networking protocol while presenting to the wireless networking protocol an image of a control server. The wireless networking protocol may include any protocol used with Internet of Things ("IoT") including Bluetooth, ZigBee, Ethernet, WirelessHART, DigiMesh, ISA100.11 a, IEEE 802.15.4, NFC, ANT, Eddystone, EnOcean, Wi-Fi, and WiMAX. An initial reduced packet is smaller than a corresponding initial network packet—the reduced packet is the payload that remains after the header has been removed; various combinations of possible reduced packets exist and nonlimiting examples are: a reduced packet that 1) only has an instruction for altering the status of a remote device, a device address, and a security token, 2) a reduced packet that only has an instruction for altering the status of a remote device and a remote device address; 3) and a reduced packet that only has an instruction for altering the status of a remote device. The reduced packet may be sent using a lower-bandwidth wires communication. The remote device indicates a control server to which communication is sent. A relay device receives reduced communication packet and sends the information in the reduced communication packet to a control server. The device may be communicatively connected to a control system. The method may be implemented as a part of another device, such as a wireless network router, an http router, or a general purpose computing device. The control server responds to the relay device. The relay device presents to the remote device that it is the control server, providing the remote device the image of communicating directly with the control server.

The method for communicating with a network device may be implemented by an apparatus that maintains a two-way connection between a remote device and a control server. In one example access control is provided by approaching an enabled household device, such as a lock, and pressing a button. The button causes the household device to wake up and initiate contact with a control server. A wireless router implementing the method receives the contact request from the remote device, encapsulates the request in a network packet, and sends the network packet to the control server. The control server responds by wrapping a response in a network packet and sending it to a wireless router which implements the method. The wireless router removes the response from the network packet and sends it, using wireless transmission technology, to the remote device.

With a control server connected to the Wi-Fi router that implements a method, a two-way connection may be maintained. The control server and the Wi-Fi router may communicate over a hardwired connection such as Ethernet, coaxial cable, or fiber optic cable. The device data server and the Wi-Fi router may communicate using a wireless protocol, such as 802.1(g), 802.1(n), or another wireless protocol.

Definitions

For purposes of this disclosure as used in the present specification and in the appended claims:

A "device list" is a list of one or more devices that are connected to or are authorized to be connected to a server; the device list may contain information about the devices such as device names, the protocols used to connect the devices, addresses, the status of the device, and other information; a device list may be in a data format that may be stored on a non-transitory storage medium.

A "household device" is an apparatus that may be used around a residential dwelling. A household device may be used in commercial settings to perform the same tasks as in a residential setting. A household device may be, but is not limited to, a lock, a door knob, a microwave oven, a slow cooker, an oven, a stove, a refrigerator, etc.

A "status code" is an instruction for altering the status of a remote device to a certain state, such as "on", "off", or "standby mode". Typically, a different status code is used to signify "on" from the status code which is used to signal "off".

"Unwrapping" is to perform a type of un-encapsulation which means to start with a packet, such as an IP packet, and form a reduced packet by removing the payload data from the non-payload data, which, in the example of an IP packet, would be Internet Protocol header data; unwrapping may be performed on any protocol used for transmitting data.

"Wrapping" is to perform a type of encapsulation which means combining non-payload data, such as protocol header data like IP protocol header data for an IP packet, with payload data to form a network packet; wrapping may be performed on any protocol used for transmitting data.

"Stable State" is a predefined state for a remote device such that the remote device does what is most common or desirable for that device. For example, the stable state of a lock may be locked.

"long range communication" is a communication that extends the expected limits of a communication protocol. Long range communication may experience decreased bandwidth and/or increased error rates.

Referring now to the figures, FIG. 1 illustrates an apparatus that implements a method to send communication between a remote device and a control server. FIG. 1 illustrates a remote device controller (120) using a wireless connection (122) to communicate with a remote devices (131). The remote device controller (120) maintains communication (111) with a control server (110). The remote device controller (120) monitors the remote devices (131) to identify when a remote device is in an unexpected state. The unexpected state may include that the remote device is not responding. The remote device controller (120) alerts the control server (110) when remote devices (131) are not responding to status checks. The remote device controller (120) also receives data from the remote device (131) that is addressed to the control server (110). The remote device controller (120) may appear to the remote device (131) to be the control server (110). Monitoring by the remote device controller (120) provides the control server (110) information about remote devices (131) when the remote devices (131) fail to respond as the remote devices (131) as expected. The remote device controller (120) communicates and transforms information sent from the control server (110) and the remote device (131). The remote device controller (120) also communicates from the remote device (131) and the control server (110). The remote device controller (120) may communicate with a number of remote devices (131) using a long range wireless communication protocol (122) in a house (130) or business. The remote device controller (120) communicates with the control server (110) using a networking protocol (111).

The remote device controller (120) sends packets to the remote devices (131) to cause the remote devices to respond. Each reduced response packets includes the status of the originating remote device (131). The packets sent solicit information about the remote devices. The each packet may query the remote device for attributes related to the type of the particular remote device.

The remote device controller (120) receives reduced response packets from a number of remote devices (131). The reduced response packets indicate the status of a remote device (131) that generated the reduced response packet. The status of the originating device identifies the remote device and describes features of the operation and describes performance levels of the remote device.

Reduced response packets that are received are examined. The examination of the reduced response packets may also examine data associated with the corresponding remote device and a number of remote devices attributes. The examination of reduced response packets may consider that a remote device failed to respond. The examination of reduced response packets may examine data common to a number of devices, such as distance, time, age of the remote device, weather, or the relationship of a remote device to other remote devices.

A remote device fault report is generated when a fault is detected for a remote device. The remote device fault report identifies the remote device and attributes related to the detected fault. Information regarding the device and factors that may have contributed to the fault may be included in the report.

The remote device fault report is transmitted to the control server (110). The remote device fault report is transmitted over a network interface. The network interface may provide wireless network connectivity. The network interface may provide wired network connectivity. The network interface may interact with a network router to transmit the remote device fault report across an internet connection or cloud computing environment.

Figure 2:
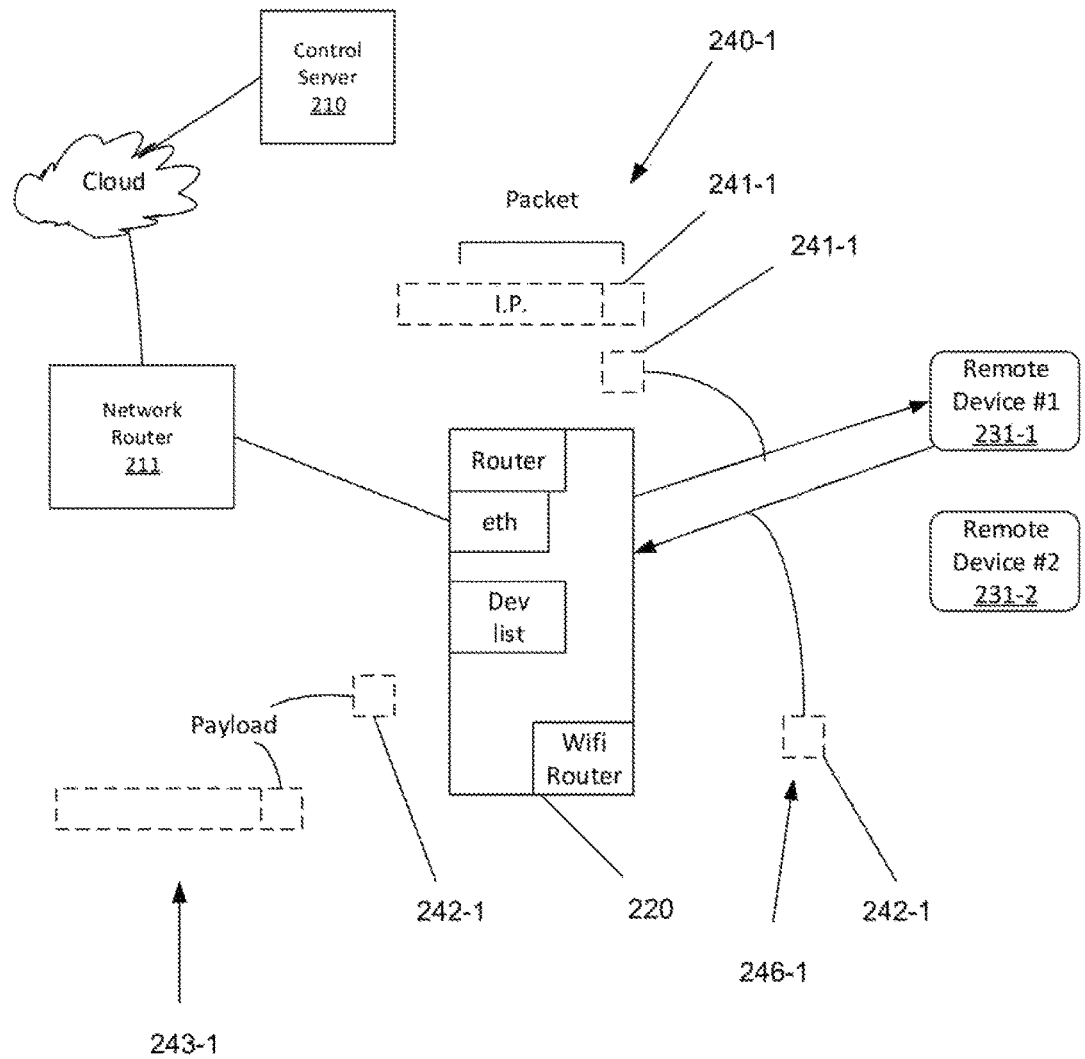
FIG. 2 illustrates a system including an apparatus for communicating with a control server and a household device.

Referring now to FIG. 2, a remote device controller (220) is depicted. The remote device controller (220) may include a Wi-Fi router or other types of routers. The remote device controller (220) may be a computer system that includes a Wi-Fi router, a device list, an Ethernet router or port for connecting to a Wi-Fi router of a server or other device, and one or more routers for connecting to a server using a protocol such as Bluetooth®. The remote device controller (220) may be connected to the cloud by a network router (211). The remote device controller (210) may also be connected with a remote device (231). The remote device controller (2220) may be configured to perform a type of un-encapsulation referred to herein as "unwrapping," which means to take a packet, such as an IP packet, and form a reduced packet by removing the payload data from the non-payload data, which in the example of an IP packet would be Internet Protocol header data; The remote device controller (220) may then transmit the reduced packet (24101) to remote device one (231-1). Use of data unwrapping and corresponding data "wrapping", which is a form of encapsulation in which non-payload data is added to payload data to form a network packet, may be used so that the remote device (231) may appear to be communicating directly with a control server (210) at a longer range than is typically used, such as over 0.5 miles or even over 0.9 miles. The remote server (1004) may have a device list, a Wi-Fi router, and other routers for communicating with devices using different protocols other than Wi-Fi. The communication between the remote device (231) and the control server (210) may at times to allow "handshaking" between the remote device (231) and the control server (210) to establish a connection. A control server (210) may be configured to identify the payload that is sent by the remote device (231) and determine for which control server (210) the reduced packet is intended. The remote device controller (220) appears the remote devices (231) to be a control server (210). The remote device controller (220) may also derive the payload for the control server (210 deriving the network header based on the payload data received. At times, a more secure method may be used, where a security token is transmitted. The remote device controller (220) may then send the device command to a smart device (231) such as a Bluetooth®-enable device, such as a door lock, connected remote device controller (220) via an appropriate router, such as a Bluetooth® router. Remote device controller (220), or may be connected to multiple devices using multiple protocols and it may have a device list. The remote device controller (220) may connect to a number of control servers (210). A reduced packet may be under 200 bytes or bits, may be under 64 bits or bytes, may include 16-bit encryption, may be as small as a single bit which encodes information for instructing a remote device to change state.

An overall example according to FIG. 2 will now be given. The remote device controller (220) sends a reduced packet (241-1) to a remote device (231-1) to determine that the remote device (231-1) is functioning within a predefined range of operation. The reduced packet (241-1) may consist of a reduced device identifier and a data payload. The reduced packet (241-1) may be transmitted using a radio communication system that has limited or restricted bandwidth. The reduced packet (241-1) may be a single byte, two bytes, or four bytes. The reduced packet (241-1) contains less information than a network packet. The reduced packet (241-1) causes the remote device (231-1) to respond with a reduced response packet (246-1) for the remote device (231-1).

The remote device controller (220) receives from a number of remote devices (231) reduced response packets. The reduced response packets identify the responding remote device (231). The reduced response packet (246-1) provides information about the state of a responding remote device (231). When a remote device does not respond, the remote device controller (220) may determine the remote device is in a fault state.

The remote device controller (220) examines treated to each of the number of remote devices (231). The remote device controller (220) may examine information related to the remote device that generated the reduced response packet (246-1). A lack of a reduced response packet may inform the examination into the state of remote devices (231).

The remote device controller (220) generates a remote device fault report when a fault is detected in a remote device. The remote device fault report indicates information about the fault, such as the remote device, the type of fault detected, and when the fault was detected.

The remote device controller (220) transmits the remote device fault report to a control server (210). The control server may provide information regarding intervention to correct the fault in the remote device.

Figure 3:
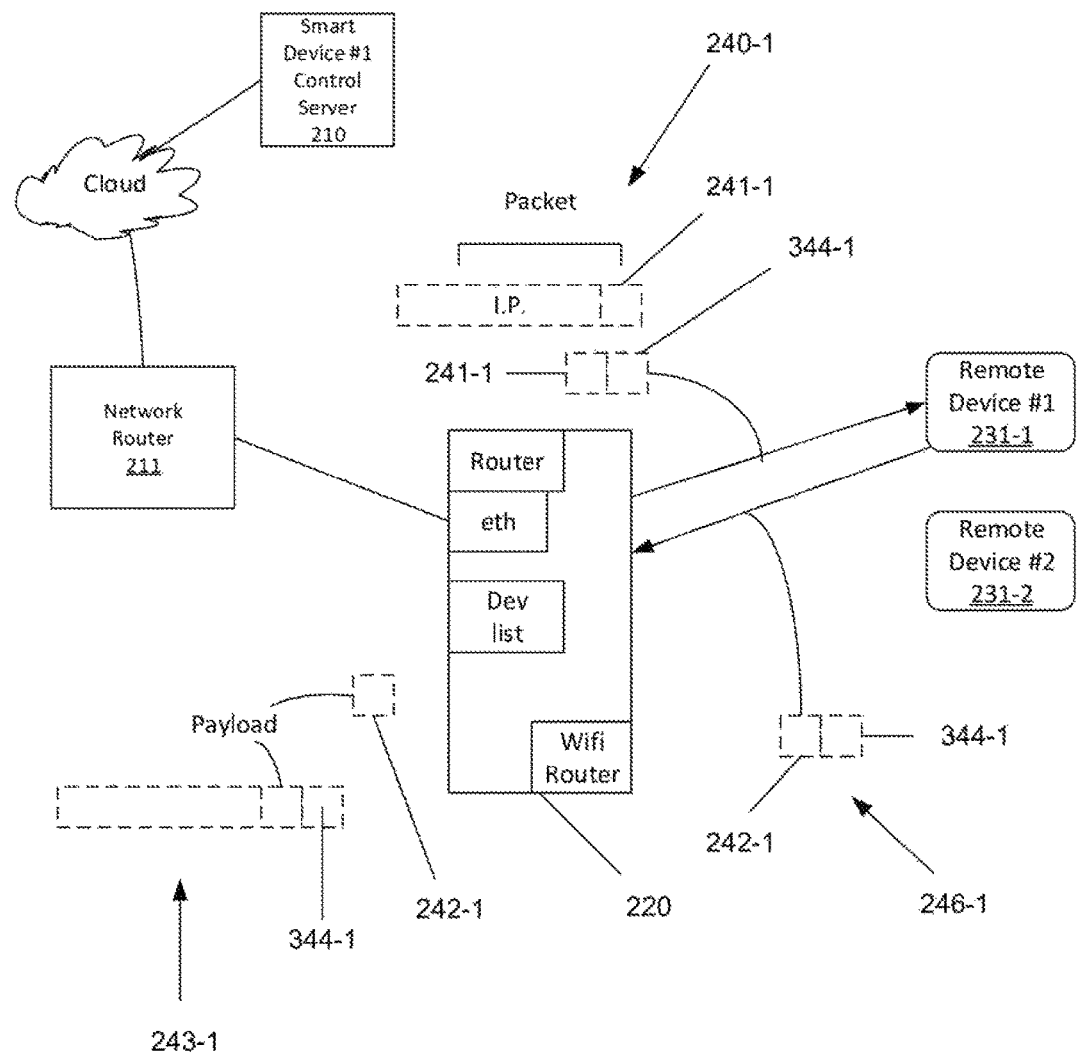
FIG. 3 illustrates a system including an apparatus for communicating with a control server and a household device.

Referring now to FIG. 3, a system including a remote device controller (220) is depicted. FIG. 3 represents an extension of the example in FIG. 2 including a security token (344-1). In this example, the remote device controller (220) sends a reduced network packet (241-1) with a security token (344-1). The reduced network packet contains payload data (242-1). The payload data causes the remote device (231-1) to respond with the status of the remote device. The security token (344-1) may be used to encrypt the payload data (241-1). The security token may provide data integrity verification through a checksum value or other methods of validating the payload data.

The security token (344-1) may be received in a network packet (243-1) through a network router (211) from a control server (210). The remote device controller (220) may send a network packet (240-1) back to the control server (210) using the security token (344-1). The remote device controller (220) may use the security token (344-1) to send a remote device status report to the control server (210)

Figure 4:
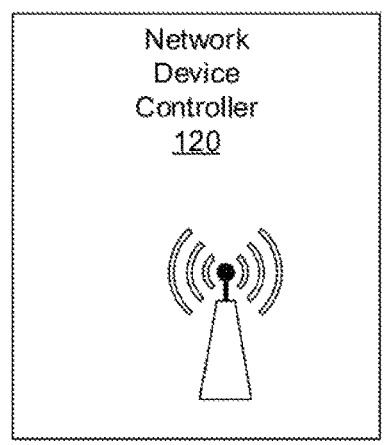
FIG. 4 illustrates a number of radio waves transmitted by an apparatus.
Figure 4:
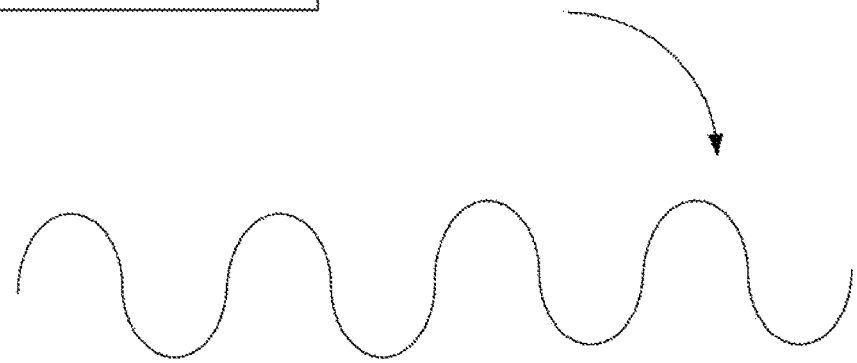
Figure 4:
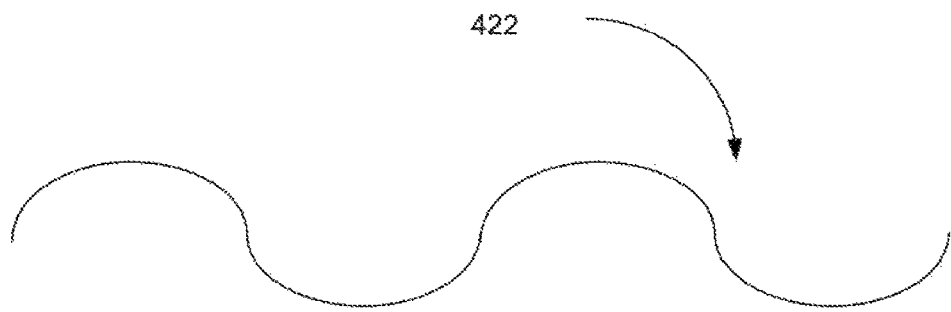

FIG. 4 illustrates a number of radio waves as may be transmitted by the remote device controller (120). A first radio signal (421) may be compared to a second radio signal (422). The first radio signal (422) has a shorter wave length when compared to the second radio signal (422). It corresponds that the longer wavelength of the second radio signal (422) may have a lower frequency. In some instances, a lower frequency may carry less data than a higher frequency.

Figure 5:
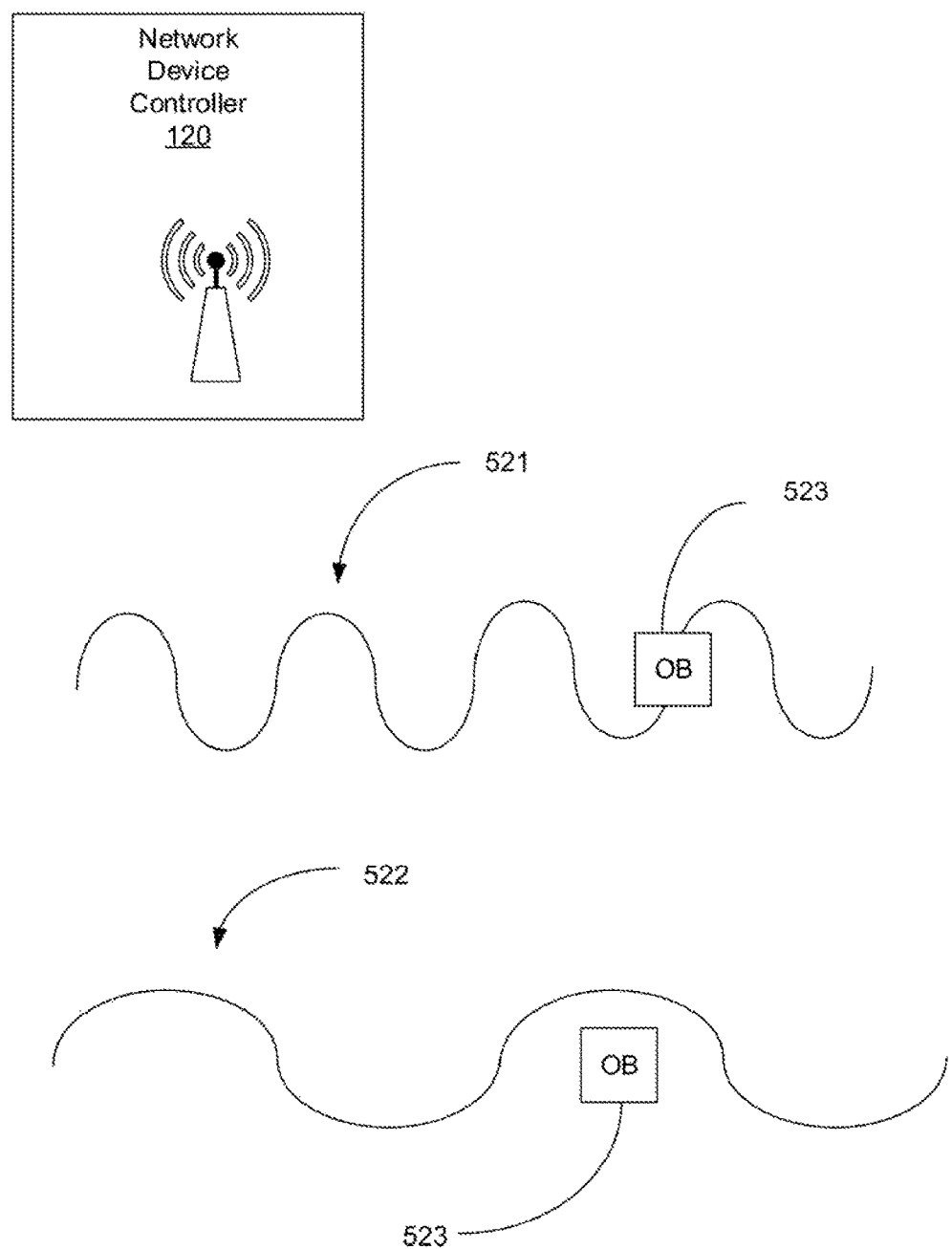
FIG. 5 illustrates a number of radio waves transmitted by an apparatus where the radio waves may be inhibited by environmental barriers.

FIG. 5 illustrates a number of radio waves that may be transmitted by the remote device controller (120). A first radio signal (521) may be compared to a second radio signal (522). The first radio signal (522) has a shorter wave length when compared to the second radio signal (522). The radio signal with the longer wavelength (522) may avoid interference from various objects (523). The avoidance of interference with propagation may allow radio waves to propagate further without consuming additional power. The longer wavelength and improved propagation comes at the cost of transmitting less data. When the remote device controller (120) communicates with a remote device (FIG. 1, 131), the transmission may take longer or have more interference. A smaller packet may allow the data that may actually be used to be transmitted in similar amounts of time a packet transmitted using a networking protocol.

Figure 6:
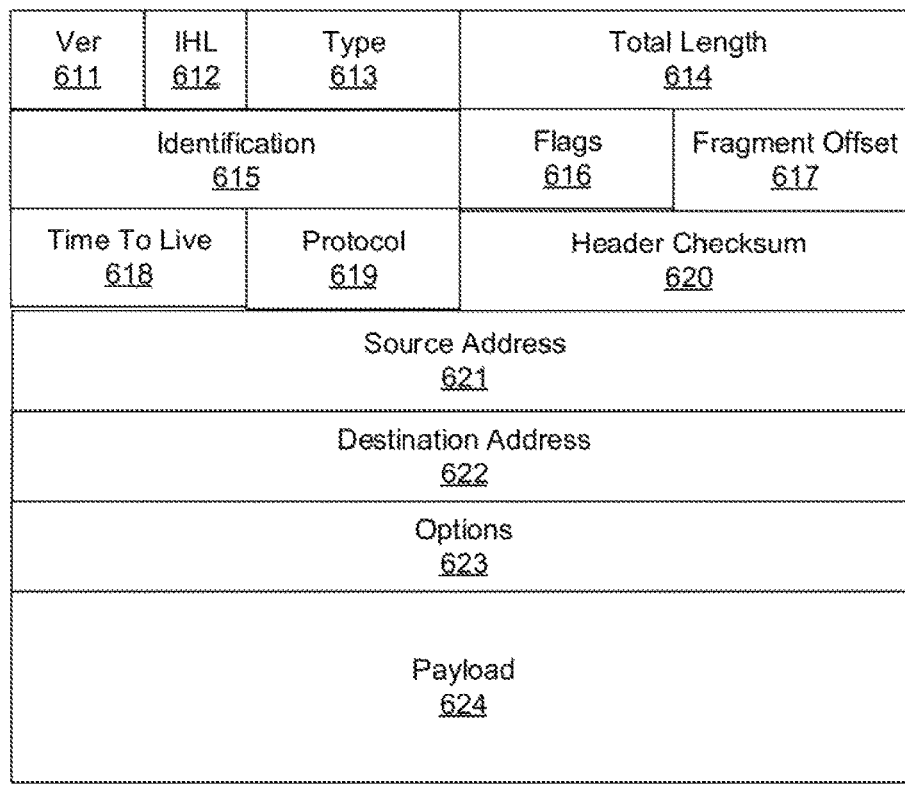
FIG. 6 illustrates a network packet and a reduced network packet as sent and received by a method for communicating with a control server and a household device.
Figure 6:
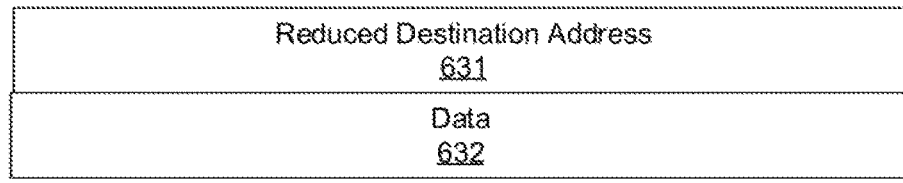

FIG. 6 illustrates a number of data packets as sent or received by the Remote device controller (FIG. 1, 120). In one example, the remote device (FIG. 1, 131) sends a reduced packet (630) containing a reduced destination address (631) and data (632). The reduced packet (630) is sent using a wireless protocol from the remote device (FIG. 1, 131) to the remote device controller (FIG. 1, 120). The remote device controller (FIG. 1, 120) then wraps the reduced packet (630) as payload data (624) in a network packet (610) to be transmitted over a computer network using Internet Protocol Version Four (IPv4)

The network packet (610) may be sent or received over a computer network. In this example, IPv4 is depicted. In a different example, a different networking protocol may be received. The network packet (610) includes a version (611), an IHL (612), a type (613), a total length (614), an identification (615), a number of flags (616), a fragment offset (617), a time-to-live (618), a protocol flag (619), a header checksum (620), a source address (621), a destination address (622), a number of options, (623), and a payload (624). The payload (624) is assigned the values of the reduced packet (630).

The network packet (610) is sent through a network router (FIG. 2, 211) to a control server (FIG. 1, 110). The control server (FIG. 1, 110) may send back a response network packet that wraps a response reduced packet. The remote device controller (FIG. 1, 120) receives the response network packet, unwraps the response reduced packet, and sends the response reduced packet to the remote device (FIG. 1, 131).

A number of data packets may be received or sent by the Remote device controller (FIG. 1, 120). The network packet (610) may be received over a computer network. In one example, an Internet Protocol Version Four (IPv4) is shown. In one example, the reduced packet (630) received as payload in an IPv4 packet includes a reduced destination address (631) and data (632).

Figure 7:
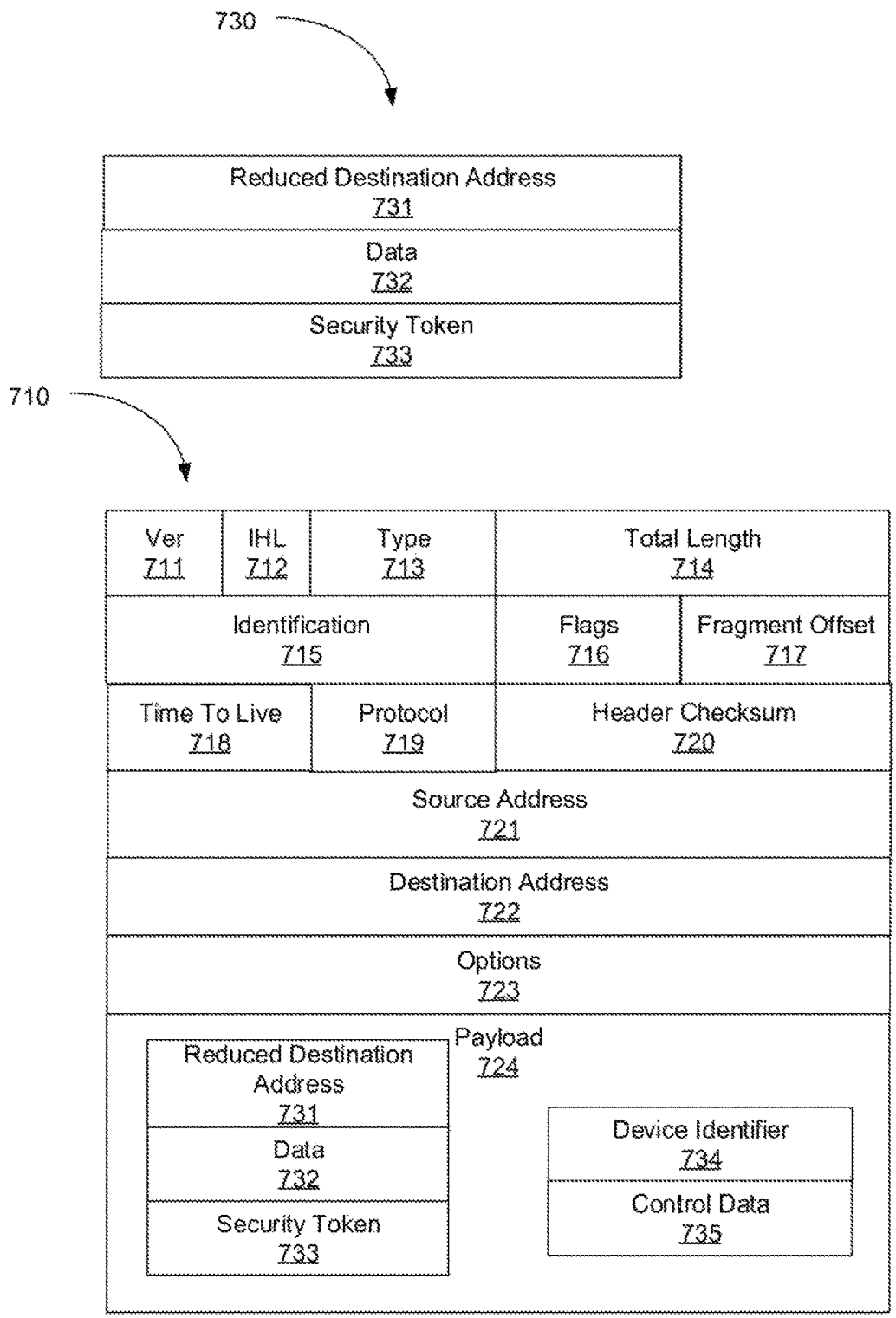
FIG. 7 illustrates a network packet and a reduced network packet as sent and received by a method for communicating with a control server and a household device.

FIG. 7 illustrates a number of data packets as sent or received by the Remote device controller (FIG. 1, 120). In one example, the remote device (FIG. 1, 131) sends a reduced packet (730) containing a reduced destination address (731), data (732), and a security token (733). The reduced packet (730) is sent using a wireless protocol from the remote device (FIG. 1, 131) to the remote device controller (FIG. 1, 120). The remote device controller (FIG. 1, 120) then wraps the reduced packet (730) as payload data (724) in a network packet (710) to be transmitted over a computer network using Internet Protocol Version Four (IPv4)

The network packet (710) may be sent or received over a computer network. In this example, IPv4 is depicted. In a different example, a different networking protocol may be received. The network packet (710) includes a version (711), an IHL (712), a type (713), a total length (714), an identification (715), a number of flags (716), a fragment offset (717), a time-to-live (718), a protocol flag (719), a header checksum (720), a source address (721), a destination address (722), a number of options, (723), and a payload (724). The payload (724) is assigned the values of the reduced packet (730). As illustrated, the payload (724) includes a reduced destination address (731), data (732), and a security token (733). Additional data may be assigned to the payload (724), to manage communication between the remote device (FIG. 1, 131) and the control server (FIG. 1,110). As illustrated, the payload (724) includes a device identifier (734) and control data (735)

The network packet (710) is sent through a network router (FIG. 2, 211) to a control server (FIG. 1, 110). The control server (FIG. 1, 110) may send back a response network packet that wraps a response reduced packet. The remote device controller (FIG. 1, 120) receives the response network packet, unwraps the response reduced packet, and sends the response reduced packet to the remote device (FIG. 1, 131).

FIG. 7 illustrates a number of data packets as received or sent by the Remote device controller (FIG. 1, 120). The network packet (710) may be received over a computer network. In one example an Internet Protocol Version Four (IPv4) packet is shown. In another example, the reduced packet (730) may include a reduced destination address (731), data (732), and a security token (733). The security token (733) may authenticate a remote device (FIG. 1, 131) and the network device control (FIG. 1, 120).

Figure 8:
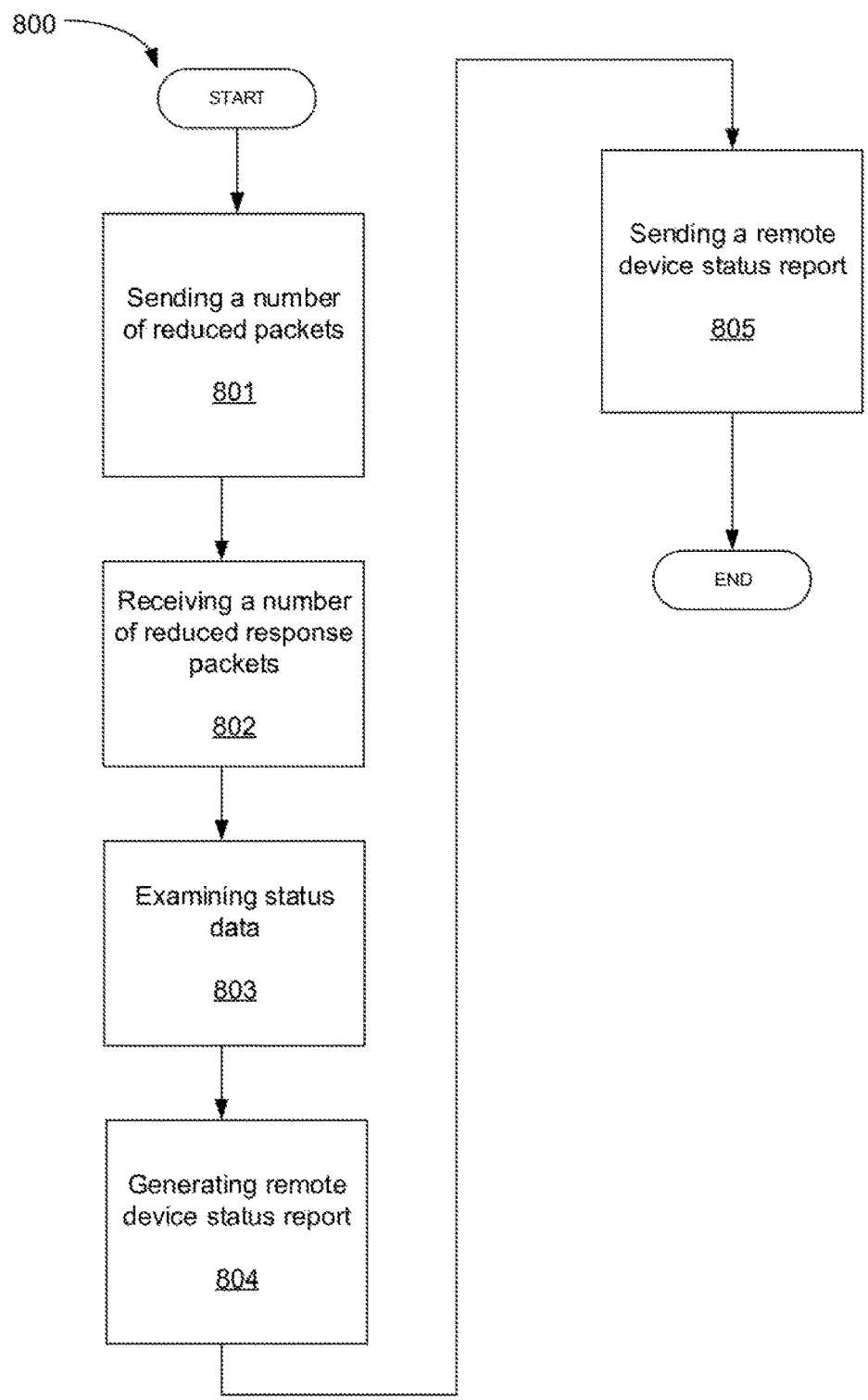
FIG. 8 illustrates an example of a method for controlling communication between a remote device and a control server.

FIG. 8 is a flow chart of a method (800) for controlling communication between a remote device and a control server. The method includes sending (801), over a long range radio communication link, to a number of remote devices, a number of reduced packets. Each of the number of reduced packets causes each of the number of remote devices to generate a reduced response packet. The reduced response packet indicates a status of each of the number of remote devices. The method includes receiving (802), from a number of responding remote devices, a number of actual reduced response packets to identify when a remote device is in a report state. The method includes examining (803) status data related to each of the number of remote devices. The status data includes a number of attributes include a remote device reduced packet, a remote device reduced response packet, and a number of remote device attributes. A remote device fault report is generated (804) when a fault is detected. The remote device fault report is transmitted (805) to a control server.

The method (800) includes sending (801), over a long range radio communication link, to a number of remote devices, a number of reduced packets. Each of the number of reduced packets causes each of the number of remote devices to generate a reduced response packet. The reduced response packet indicates a status of each of the number of remote devices. A remote device that receives a reduced packet may attempt to respond to that reduced packet with a reduced response packet. The reduced response packet provides status information regarding a remote device that generates the reduced response packet. The status information may include the state of the remote device, information regarding components of a remote device, such as a battery, or information about the communication link with the remote device.

The remote device controller (FIG. 1, 120) receives (802), from a number of responding remote devices, a number of actual reduced response packets to identify when a remote device is in a report state. Each reduced response packet provides information about the originating remote device. A number of remote device packets may be sent in response to the reduced packet.

The method includes examining (803) status data related to each of the number of remote devices. The status may include the state of a remote device, such as locked or unlocked, on or off, or a temperature reading or setting. The status data may include information about the age of the device, the frequency of use, or the expected battery life of the battery in the device. The status data may also provide information about the signal strength.

The method (800) includes generating a remote device fault report is generated (804) when a fault is detected. The remote device fault report provides information about a possible failure of one or more of the remote devices.

The method (800) includes sending (805) the remote device status report to a control server (FIG. 1, 110) using a computer network. The remote device status report may be sent using a networking protocol to a control server. The control server may indicate to a user that a remote device has had a fault. The control server may provide information about the fault to enable the remote device to be serviced.

An overall example using FIG. 8 will now be given. A number of reduced packet are sent (801) to a number of remote devices (FIG. 1, 131). The remote devices (FIG. 1, 131) in this example are a door knob (FIG. 1, 131-1) and a deadbolt (FIG. 1, 131-2). The reduced packet causes the remote devices (FIG. 1, 131) to respond and include the lock state of the remote device (FIG. 1, 131) and the energy storage level of the battery in each remote device (FIG. 1, 131).

The doorknob (FIG. 1, 131-1) responds to the remote device controller (FIG. 1, 120), but the deadbolt (FIG. 1, 131-2) does not respond. The response from the doorknob (FIG. 1,131-1) indicates that the doorknob is functioning within specification, and that the doorknob (FIG. 1, 131-1) is currently in a locked state. The remote device controller (FIG. 1, 120) receives to response from the doorknob (FIG. 1, 131-1) but does not receive a response from the deadbolt (FIG. 1, 131-2).

The remote device controller (FIG. 1, 120) examines the reduced packets and the devices to which the reduced packets are sent. The remote device controller identifies that the deadbolt (FIG. 1, 131-2) did not respond. The remote device controller (FIG. 1, 120) examines related data that indicate the deadbolt failed to respond to the prior inquiry, and that the last response from the deadbolt indicated that the battery powering radio communication for the deadbolt was failing.

A remote device fault report is generated. The remote device fault report indicates that the deadbolt (FIG. 1, 131-2) has failed and that the state of the device is unknown, but likely a battery failure. The remote device fault report includes the location of the deadbolt (FIG. 1, 131-2). The remote device fault report indicates that other remote devices in the vicinity of the deadbolt (FIG. 1, 131-2) are functioning within specification. The remote device fault report also indicates that the doorknob (FIG. 1, 131-1) is in the lock state, securing the door associated with both the deadbolt (FIG. 1, 131-2) and the doorknob (FIG. 1, 131-2). The remote device fault report indicates that the doorknob (FIG. 1, 131-1) is in a locked state, indicating that the door is secure. In prioritizing the fault state, other factors are examined. In this example, the response from the doorknob (FIG. 1, 131-1) is examined, as well as the distance to the deadbolt (FIG. 1, 131-2) and the last response from the deadbolt (FIG. 1, 131-2). It is determined that the deadbolt (FIG. 1, 131-2) is in an error state and that an individual who services the deadbolt (FIG. 1, 131-2) should bring a battery.

The remote device fault report is transmitted to the control server (FIG. 1, 110). The control server generates a work order instructing repairs to the remote device. The work order indicates that the battery of the deadbolt may have contributed to the fault.

Figure 9:
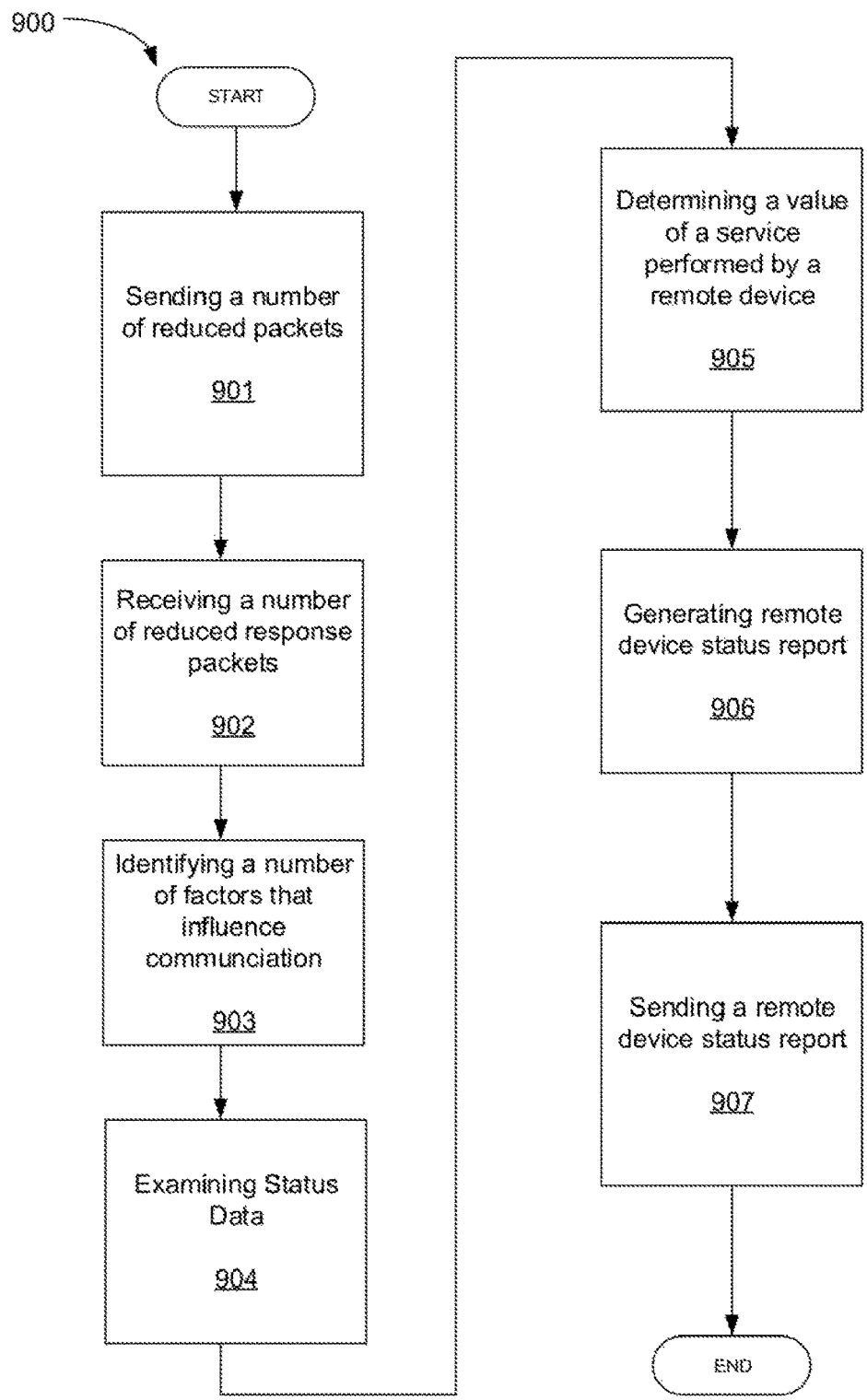
FIG. 9 illustrates an example of a method for controlling communication between a remote device and a control server.

FIG. 9 is a flow chart of a method (900) for controlling communication between a remote device and a control server. The method (900) includes sending (901), over a long range radio communication link, to a number of remote devices, a number of reduced packets. Each of the number of reduced packets causes each of the number of remote devices to generate a reduced response packet. The reduced response packet indicates a status of each of the number of remote devices. The method includes receiving (902), from a number of responding remote devices, a number of actual reduced response packets to identify when a remote device is in a report state. The method (900) includes identifying (903) a number of factors that influence communication with remote devices. The method (900) includes examining (904) status data related to each of the number of remote devices. The status data includes a number of attributes include a remote device reduced packet, a remote device reduced response packet, and a number of remote device attributes. The method (900) includes determining (905) a value of service performed by remote devices. The method (900) includes generating (906) a remote device fault report when a fault is detected. The method (900) includes transmitting (807) the remote device fault report to a control server.

As described above, the method (900) includes sending (901), over a long range radio communication link, to a number of remote devices, a number of reduced packets. As described above, the method includes receiving (902), from a number of responding remote devices, a number of actual reduced response packets to identify when a remote device is in a report state.

The method (900) includes identifying (903) a number of factors that influence communication with remote devices. The identifying (903) may consider factors external to the remote device, such as distance, weather, history, solar flares, and societal disruption in that may influence either the ability of the remote device to respond or the need for the remote device to respond.

As described above, the method (900) includes examining (904) status data related to each of the number of remote devices.

The method (900) includes determining (905) a value of service performed by remote devices. A device may perform a minor task, such as providing light to a seldom used area. A minor task may be assigned a lower priority than a critical task. A remote device performing a critical task may be a single point of failure, or the consequences of the remote device failing would be catastrophic. For example, a single lock on a cage for a dangerous animal may be considered a dangerous task. The priority of the task may be influenced by the number of remote devices performing similar or related tasks. For example, when there are two locks on a door, a failure of a single lock may not be a high priority.

As described above, the method (900) includes generating (906) a remote device fault report when a fault is detected. As described above, the method (900) includes transmitting (807) the remote device fault report to a control server.

Figure 10:
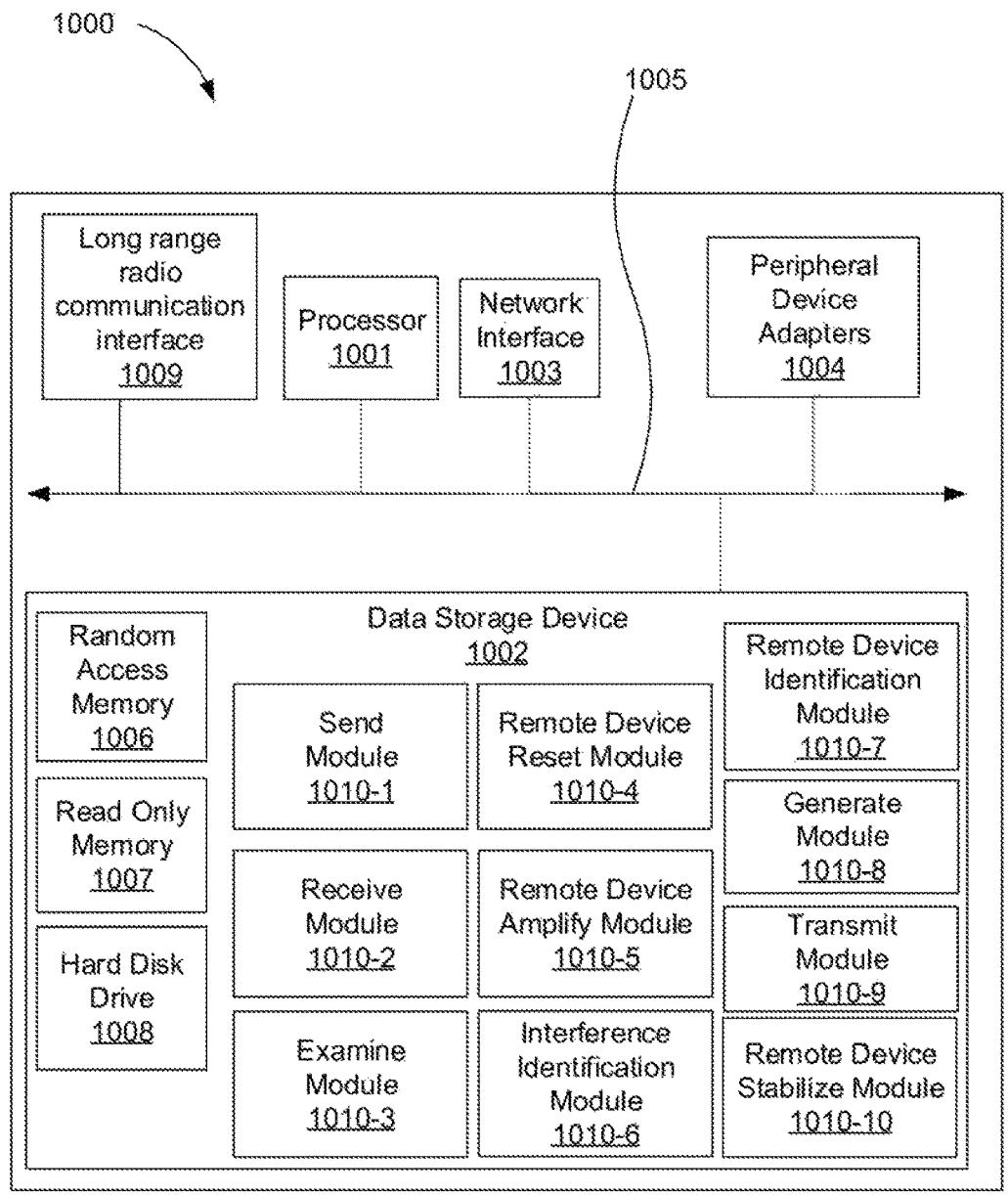
FIG. 10 illustrates an apparatus for controlling remote devices.

FIG. 10 represents a computer device (1000) for handling communication between a remote device and a control server. The computing device (1000) may be utilized in any data-processing scenario, including stand-alone hardware, mobile applications, a computing network, or combinations thereof. Further, the computing device (1000) may be used in a computing network, a public cloud network, a private cloud network, a hybrid cloud network, other forms of networks, or combinations thereof. In one example, the methods provided by the computing device (1000) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (1000) are executed by a local administrator.

To achieve its desired functionality, the computing device (1000) may include various hardware components. Among these hardware components may be a number of processors (1001), a data storage device (1002), a number of peripheral adapters (1004), a long range radio communication interface, and a number of network interface (1003). These hardware components may be interconnected through the use of a number of buses and/or network connections. In one example, the processor (1001), data storage device (1002), peripheral device adapters (1004), long range radio communication interface, and network interface (1003) may be communicatively coupled via a bus (1005).

The computing device (1000) may include various types of memory modules, including volatile and nonvolatile memory. For example, the data storage device (1002) may include Random Access Memory (RAM) (1006), Read Only Memory (ROM) (1007), and Hard Disk Drive (HDD) memory (1008). Many other types of memory may also be utilized, and the present specification contemplates the use of as many varying types) of memory in the computing device (1000) as may suit a particular application of the principles described herein. In other examples, different types of memory in the computing device (1000) may be used for different data storage needs. In some examples, the processor (1001) may boot from Read Only Memory (ROM) (1007), maintain nonvolatile storage in the Hard Disk Drive (HDD) memory (1008), and execute program code stored in Random Access Memory (RAM) (1006).

Generally, the computing device (1000) may comprise a computer readable medium, a computer readable storage medium, or a non-transitory computer readable medium, among others. For example, the computing device (1000) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware interfaces (1003, 1004) in the computing device (1000) enable the processor (1001) to interface with various other hardware elements, external and internal to the computing device (1000). The peripheral device adapters (1004) may provide an interface to input/output devices, such as a long range radio communication interface (1009), to communicate with a remote device. The peripheral device adapters (1004) may also provide access to other external devices, such as an external storage device, a number of network devices, such as servers, switches, and routers, client devices, other types of computing devices, or combinations thereof.

The long range radio communication interface (1009) may be provided to allow the computing device (1000) to interact with a remote device (FIG. 1, 131). The peripheral device adapters (1004) may create an interface between the processor (1001) and the radio transmitter (1009), a printer, or other media output devices. The network interface (1003) may provide an interface to other computing devices within, for example, a network, thereby enabling the transmission of data between a communication receiving module to receive, from a device, a communication packet.

The Data Storage Device (1002) includes a number of modules. Each module performs a task. Each module may comprise a combination of hardware, software, or both. In this example, the Data Storage Device (1002) includes a Send Module (1010-1), a Receive Module (1010-2), an Examine Module (1010-3), a Remote Device Reset Module (1010-4), a Remote Device Amplify Module (1010-5), an Interference Identification Module (1010-6), a remote Device Attribute Identification Module (1010-7), a Generate Module (1010-8), a Transmit Module (1010-9), and a Remote Device Stabilize Module (1010-10).

The Send Module (1010-1) sends, over a long range radio communication interface (1009), to a number of remote devices, a number of reduced packets. Each of the reduced packets causes a number of remote devices to generate a reduced response packet. The reduced response packet indicates a status of each of the number of remote devices. The long range radio communication interface (1009) communicates over distances longer than wifi communication The Receive Module (1010-2) receives, from a number of responding remote devices, a number of actual reduced response packets to identify when a remote device is in a report state. The Receive Module (1010-2) may not receive any response packet.

The Examine Module (1010-3) examines status data related to each of the number of remote devices, the status data comprising a number of attributes include a remote device reduced packet, a remote device reduced response packet, and a number of remote device attributes.

The Remote Device Reset Module (1010-4) causes a series of signals to be sent to a remote device to cause the remote device to reset. A remote device reset may clear a fault state and allow the remote device to respond appropriately.

The Remote Device Amplify Module (1010-5) causes a series of signals to be sent to a remote device to cause the remote device to respond with an amplified signal. The remote device may normally operate at a lower power transmission and may only use an amplified signal upon request to preserve electrical energy stored in a battery associated with the remote device.

The Interference Identification Modules (1010-6) interference identification module identifying factors that interfere with communication with a remote device. For example, the interference identification module may determine an environmental factor, such as wind, rain, snow, or heat that may affect communication with the remote devices. The interference identification module may determine a distance to a remote device or radio communication obstacles between the device controller and the remote device.

The remote device attribute identification module (1010-7) may identify attributes of a remote device. Attributes may include make, model, type, task, and performance parameters.

The Generate Module (1010-8) generate, when a fault is detected, a remote devices fault report.

The Transmit Module (1010-9) transmits, to a control server using the network interface, a remote device fault report.

The Remote Device Stabilize Module (1010-10) causes a series of signals to be sent to a remote device to cause the remote device to respond with an amplified signal. The stable state may be an attempt to put the remote device into a preferred, non-responsive state until a service technician can arrive to service the remote device.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A method for controlling communication between a remote device and a control server, the method comprising:
    receiving a first packet from the control server;
    generating a first reduced packet by unencapsulating the first packet;
    sending, over a long range radio communication link, the first reduced packet to the remote device;
    receiving, over the long range radio communication link, a second reduced packet from the remote device;
    generating a second packet by encapsulating the second reduced packet;
    sending the second packet to the control server;
    sending, over the long range radio communication link, a third reduced packet to the remote device, the third reduced packet causing the remote device to generate a third reduced response packet, the third reduced response packet indicating a status of the remote device;
    detecting the status of the remote device based on the third reduced response packet or a lack of receipt of the third reduced response packet;
    examining the status of the remote device;
    detecting a fault based on the status;
    generating a remote devices fault report; and
    transmitting the remote device fault report to the control server.

2. The method of claim 1, further comprising identifying a number of factors that influence communication with the remote device.

3. The method of claim 2, wherein one factor of the number of factors is weather.

4. The method of claim 2, wherein one factor of the number of factors is the distance to the remote device.

5. The method of claim 2, wherein one factor of the number of factors is obstacles interfering with communication with the remote device.

6. The method of claim 1, further comprising determining a value of service performed by the remote device.

7. The method of claim 6, further comprising examining the value of served performed by the remote device.

8. An apparatus for controlling remote devices, the apparatus comprising:
    a processor;
    a network interface, communicatively connected to the processor;
    a long range radio communication interface communicatively connected to the processor;
    a non-transitory storage medium communicatively connected to the processor, the non-transitory storage medium storing instructions that when executed by the processor cause the processor to:
    receive a first packet from a control server;
    generate a first reduced packet by unencapsulating the first packet;
    send, over a long range radio communication link, the first reduced packet to a remote device;
    receive, over the long range radio communication link, a second reduced packet from the remote device;
    generate a second packet by encapsulating the second reduced packet;
    send the second packet to the control server;
    send, over the long range radio communication interface, a third reduced packet to the remote device, the third reduced packet causing the remote device to generate a third reduced response packet, the third reduced response packet indicating a status of the remote device;
detect the status of the remote device based on the third reduced response packet or a lack of receipt of the third response packet;
examine the status of the remote device;
detect a fault based on the status; and
a transmit module, to transmit, to the control server using the network interface, a remote device fault report.

9. The apparatus of claim 8, wherein the long range radio communication interface communicates over distances longer than wifi communication.

10. The apparatus of claim 8, wherein the network interface and the long range radio communication interface use a single radio antenna for communication.

11. The apparatus of claim 8, wherein the instructions are further executable by the processor to identify factors that interfere with communication with the remote device.

12. The apparatus of claim 11, wherein the factors that interfere with communication with the remote device are at least one of weather, distance, and radio communication obstacles.

13. The apparatus of claim 8, wherein the instructions are further executable by the processor to identify attributes of the remote device.

14. The apparatus of claim 13, wherein the remote device attributes include a type associated with the remote device.

15. The apparatus of claim 14, wherein the remote device attributes include a task performed by the remote device.

16. The apparatus of claim 8, wherein the instructions are further executable by the processor to send a series of messages using the long range radio communication interface to reset the remote device.

17. The apparatus of claim 8, wherein the instructions are further executable by the processor to send a series of messages using the long range radio communication interface to cause the remote device to amplify a radio response signal.

18. The apparatus of claim 8, wherein the instructions are further executable by the processor to send a series of messages using the long range radio communication interface to cause the remote device to enter a stable state.

* * * * *